K. ALQUIST.
FLEXIBLE SHAFT COUPLING.
APPLICATION FILED APR. 28, 1914.

1,233,954.

Patented July 17, 1917.

Witnesses:
Marcus L. Byng.
J. Ellis Glen

Inventor:
Karl Alquist,
by Albert G. Davis
His Attorney.

UNITED STATES PATENT OFFICE.

KARL ALQUIST, OF SCHENECTADY, NEW YORK.

FLEXIBLE SHAFT-COUPLING.

1,233,954.  Specification of Letters Patent.  Patented July 17, 1917.

Application filed April 28, 1914. Serial No. 834,877.

*To all whom it may concern:*

Be it known that I, KARL ALQUIST, a subject of the King of Sweden, residing at Schenectady, county of Schenectady, State of New York, have invented certain new and useful Improvements in Flexible Shaft-Couplings, of which the following is a specification.

The present invention relates to shaft couplings and particularly to couplings which are designed for use in connection with the transmission of large amounts of power between shafts carried in separate bearings. One application of such a coupling is in connecting a prime mover, as a steam turbine, directly to a generator, and I have illustrated and will describe my invention as being so used. It will be understood, however, that this is only by way of example.

As is well known, it is very difficult, if not impossible, to obtain absolutely exact alinement of the shafts and maintain such alinement under all operating conditions, and for this reason it is desirable to provide a coupling which is to a certain extent flexible so as to permit, not only a small error in the parallelisms of the two shafts, but also a small relative displacement or eccentricity of the two shaft ends connected by the coupling.

The object of the present invention is to provide an improved coupling of this character which will be sufficiently strong and rigid to transmit very heavy loads and which at the same time will give the desired flexibility.

In carrying out my invention I provide a rigid intermediate member or spacer, connected by suitable flexible means to the adjacent shaft ends to be joined. This intermediate spacer may take various forms, but I prefer to form it as a cylindrical member surrounding the adjacent shaft ends, as this permits of the shaft ends being arranged closely together, thereby saving in the total length of the installation. The flexible connecting means will preferably comprise flanges carried by the shafts adjacent their ends and tapered so as to give the desired degree of flexibility.

For a consideration of what I believe to be novel and my invention, attention is directed to the accompanying description and claims appended thereto.

Figure 1:
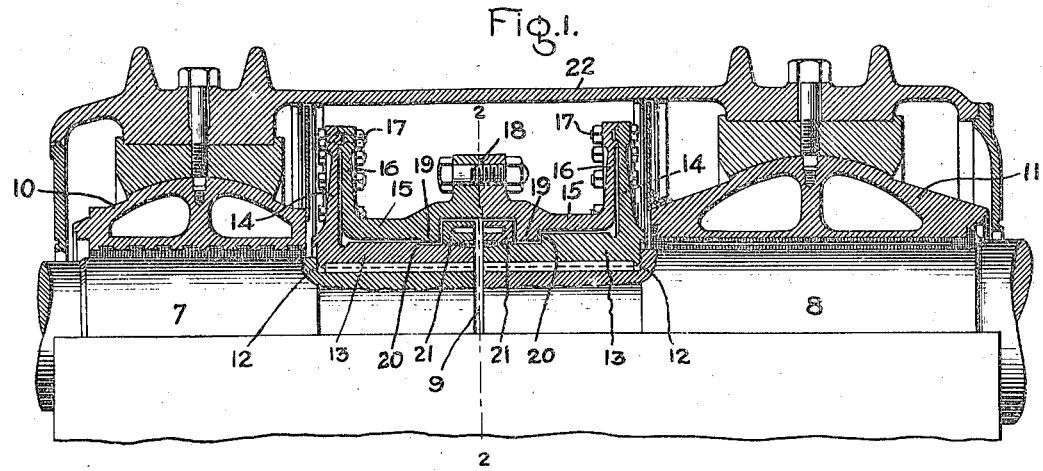
Figure 2:
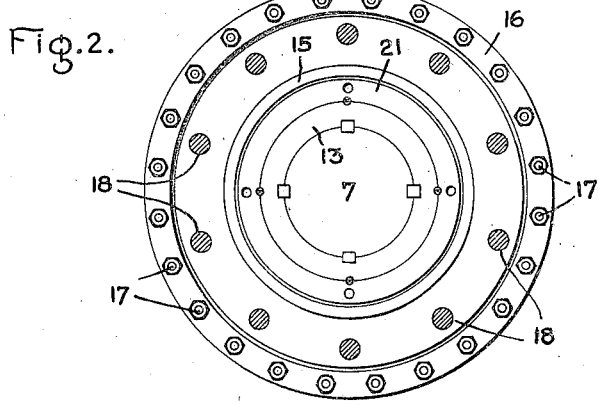
Figure 3:
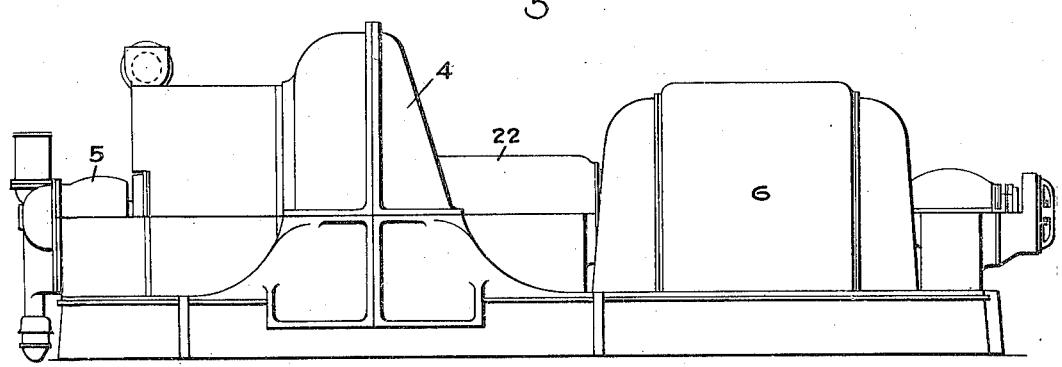

Referring to the drawing wherein I have illustrated an embodiment of my invention, Figure 1 is a side elevation, partly in section showing one form of my flexible coupling joining two shafts; Fig. 2 is a section on line 2—2, Fig. 1, and Fig. 3 is a turbo-generator set to which my coupling may be applied.

4 indicates a turbine having a thrust bearing as at 5 and driving generator 6. 7 and 8 are the driving and driven shafts respectively having their adjacent ends slightly spaced apart, as indicated at 9, and supported in suitable bearings 10 and 11. The ends of the shafts are turned down to form shoulders 12, against which abut the hubs 13 keyed to the shafts and having flanges 14 at their ends adjacent the shoulders.

These flanges are tapered as shown to give them a certain degree of flexibility. Connecting the two flanges is the intermediate member or spacer 15, here shown in the form of a cylinder, surrounding the shaft ends between the flanges 14 and suitably connected to them at their outer periphery. This connecting means may take various forms. I prefer to provide the spacer with flexible flanges 16 similar to the flanges 14 and connected thereto by bolts as indicated at 17. By this means I obtain an increased degree of flexibilty without having to make the flanges 14 unduly large in radial depth. The spacing member will preferably be formed in two parts, connected together as indicated at 18, the plane of division being between the two shaft ends. This permits readily of assembling and disassembling the coupling.

The flanges 14 and 16 are made of sufficient radial depth to give the desired degree of flexibility and in order to limit the relative movements of the two shafts suitable coöperating stops are provided. In the present instance the stops are shown in the form of projections 19 on the spacer 15 extending between the shoulders 20 on hubs 13 and the rings 21 threaded over the ends of such hubs. Access to the coupling may be obtained by removing the cover plate 22.

It will be noted that the intermediate member or spacer 15 forms in substance a short shaft section between the driving and the driven shafts and joined to them through flexible connections. One way of looking at the arrangement is that the flanges 14 define the shaft ends and between the same is the intermediate member or spacer 15. In actual practice, however, it is preferable to attach the flanges to the shaft ends by means of suitable hubs in order to obtain the necessary strength and by the arrangement I have shown I accomplish the desired result in the shortest possible space, thereby saving materially in the total length of the shaft coupling.

This will be apparent when it is noted that the flanges 14 are joined to the shaft at a point close to the bearings 10 and 11, the portion of the shaft projecting beyond the flanges serving primarily as attaching means for the hubs 13. The space between the two flanges 14 need be only of sufficient width to accommodate a spacing member of the desired length.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. The combination with alined shafts having their adjacent ends spaced but slightly apart, of a flexible coupling therefor comprising a flange secured to each of the adjacent shafts and spaced from the end thereof, a rigid intermediate member surrounding the ends of the shafts between said flanges and spaced therefrom, and flanges on said intermediate member located adjacent the first named flanges and secured thereto at their outer extremities.

2. The combination with alined shafts having their adjacent ends spaced but slightly apart, of a flexible coupling therefor comprising a flange secured to each of the adjacent shafts and spaced from the end thereof, a rigid intermediate member surrounding the ends of the shafts between said flanges and spaced therefrom, and flanges on said intermediate member located adjacent the first named flanges and secured thereto at their outer extremities, said intermediate member being formed in two parts suitably connected together, the line of division being between the two shaft ends.

3. The combination with alined shafts having their adjacent ends spaced but slightly apart, of a flexible coupling therefor comprising a flange secured to each of the adjacent shafts and spaced from the end thereof, a rigid intermediate member surrounding the shafts, flanges on said intermediate member secured at their outer extremities to the outer extremities of the first named flanges, the adjacent faces of said flanges being spaced apart except where fastened together, said intermediate member being also spaced from the shafts, and means forming a stop for limiting the relative movements of the flanges and intermediate member.

4. The combination with alined shafts having their adjacent ends but slightly spaced apart, of a hub having a flange secured to each shaft end with the flanges spaced back from said ends, a rigid intermediate member surrounding the shaft ends and spaced slightly therefrom, said member being formed in two parts suitably fastened together, the line of division being between the two shaft ends, flanges carried by said intermediate member which are spaced slightly from and connected to the peripheral portion of the first named flanges, and stop means for limiting the movements of the flanges.

In witness whereof, I have hereunto set my hand this 27th day of April, 1914.

KARL ALQUIST.

Witnesses:
BENJAMIN B. HULL,
WILLIAM E. WEISHEIT.